United States Patent [19]

Kawai et al.

[11] Patent Number: 4,556,648
[45] Date of Patent: Dec. 3, 1985

[54] SOLID CATALYST COMPONENT FOR OLEFIN POLYMERIZATION

[75] Inventors: Kiyoshi Kawai, Toyonaka; Toshiyuki Kokubo, Ibaraki; Yoshihiro Miyoshi, Takatsuki, all of Japan

[73] Assignee: Sumitomo Chemical Company, Limited, Osaka, Japan

[21] Appl. No.: 639,382

[22] Filed: Aug. 10, 1984

[30] Foreign Application Priority Data

Aug. 16, 1983 [JP] Japan ................... 58-150638

[51] Int. Cl.$^4$ ............... C08F 4/62; C08F 4/64; C08F 4/68
[52] U.S. Cl. ................... 502/112; 502/113; 502/115; 502/116; 526/114; 526/127; 526/128; 526/129
[58] Field of Search ............ 502/113, 115, 116, 112

[56] References Cited

U.S. PATENT DOCUMENTS

| | | | |
|---|---|---|---|
| 3,135,809 | 6/1964 | Bosmajian | 502/114 X |
| 3,734,900 | 5/1973 | Throckmorton | 502/113 X |
| 3,907,759 | 9/1975 | Okada et al. | 502/116 X |
| 4,109,071 | 8/1978 | Berger et al. | 526/114 |
| 4,192,772 | 3/1980 | Berger et al. | 502/113 X |
| 4,279,776 | 7/1981 | Shiga et al. | 502/115 |
| 4,310,648 | 1/1982 | Shipley et al. | 502/113 X |
| 4,438,019 | 3/1984 | Durand et al. | 502/104 |

FOREIGN PATENT DOCUMENTS

| | | |
|---|---|---|
| 56-151704 | 4/1980 | Japan . |
| 81314 | 7/1981 | Japan ................... 502/116 |
| 57-059914 | 4/1982 | Japan . |
| 57-059915 | 4/1982 | Japan . |
| A832083 | 4/1960 | United Kingdom . |

OTHER PUBLICATIONS

Chemical Abstracts, vol. 89, 198274w.

*Primary Examiner*—Patrick P. Garvin
*Attorney, Agent, or Firm*—Stevens, Davis, Miller & Mosher

[57] ABSTRACT

A solid catalyst component for olefin polymerization which is produced by reacting (A) a silicon compound with (B) a compound of transition metal of Groups IVa, Va and VIa of the periodic table to obtain a reaction mixture (I), reacting the reaction mixture (I) with (C) an organomagnesium compound selected from organomagnesium compounds or hydrocarbon-soluble complexes between an organomagnesium compound and an organometal compound capable of allowing said organomagnesium compound to be soluble in hydrocarbons to obtain an intermediate product (II), and contacting the intermediate product (II) with (D) an organoaluminum halide compound represented by the general formula $R_c^1 AlX_{3-c}$ (wherein $R^1$ is an organic group containing 1 to 20 carbon atoms, X is a halogen and c is a number defined by $0 < c < 3$) and (E) an oxidative compound.

26 Claims, No Drawings

SOLID CATALYST COMPONENT FOR OLEFIN POLYMERIZATION

This invention relates to a novel, highly active olefin polymerization solid catalyst component of Ziegler type, and to a process of preparation of said solid catalyst component.

In production of olefin polymers, use of a highly active catalyst can eliminate the step of catalyst residue removal from a polymer obtained and simplifies the process of polymer production. Therefore, such a catalyst of high activity has a high utilization value industrially. The catalyst must be high in activity per transition metal as well as in activity per solid catalyst. Many of recently developed catalysts wherein a transition metal compound such as titanium tetrachloride or the like is supported on a carrier such as a magnesium compound or the like are yet insufficient in activity per solid catalyst.

The polymer build-up on the wall of polymerization vessel in a large amount occurs various operational inconveniences causing reduction in operational efficiency. Hence, polymer build-up on the wall of polymerization vessel is desired to be as small as possible. Further, in slurry or gas phase polymerization, a polymer powder obtained is desired to have a large bulk density, a narrow particle size distribution and good flowability, viewed from operational stability and efficiency.

From the above viewpoints, a very large industrial advantage will be obtained in olefin polymerization if such an olefin polymerization catalyst is developed that has activities per transition metal and per solid catalyst sufficiently high enough to allow elimination of the step of catalyst residue removal from a polymer obtained, greatly reduces the amount of polymer build-up on the wall of a polymerization vessel and, in slurry or gas phase polymerization, provides a polymer powder of large bulk density and good flowability.

Also in olefin polymerization, the molecular weight distribution of a polymer obtained determines the processability of the polymer as well as the appearance and physical properties of goods made from the polymer. For example, a polymer of narrow molecular weight distribution is suited for injection molding or rotation molding, while a polymer of wide molecular weight distribution is suited for blow molding, extrusion molding or film extrusion. Accordingly, if the molecular weight distribution of a polymer can optionally be controlled by a simple operation, polymers suitable for a variety of applications would selectively be produced, which is very advantageous industrially.

It is well known that catalyst systems (so-called Ziegler catalysts) which are combinations of a compound of transition metals of Groups IVa, Va and VIa of the periodic table and an organometal compound of metals of Groups I, II and III of the periodic table are effective for olefin polymerization. However, these catalysts are generally low in activity necessitating removal of catalyst residues from a polymer obtained and thus do not fully satisfy the above mentioned catalyst requirements and are not sufficiently advantageous industrially. Moreover, when a polymer of wider molecular weight distribution is produced by the use of a conventional olefin polymerization catalyst, the catalyst will have a further reduced activity and the amount of catalyst used per unit polymer will increase requiring a large amount of catalyst, which is not fully advantageous industrially.

Various improvements have hitherto been made for Ziegler catalysts. For example, the following catalyst systems are disclosed as improved catalysts.

Catalyst systems consisting of an organometal compound and a reaction product obtained by heating (1) a hydroxyl-containing organic compound, (2) metallic magnesium, (3) an oxygen-containing organic compound of metal of Groups IVa, Va and VIa of the periodic table, (4) a halogen-containing compound of metal of Groups IVa, Va and VIa of the periodic table and (5) an aluminum halide compound. (Japanese Patent Publication No. 39714/1977)

Catalyst systems consisting of an organoaluminum compound and a solid reaction product among (1) a dihalide of magnesium, calcium, manganese or zinc, (2) an oxygenc-ontaining organic compound of titanium, zirconium or vanadium and (3) an organoaluminum halide compound. (Japanese Patent Publication No. 37195/1976)

Catalyst systems consisting of an organoaluminum compound and a solid catalyst component obtained by reacting in a particular ratio (1) an oxygen-containing organic compound of magnesium or a halogen-containing compound of magnesium, (2) an oxygen-containing organic compound of titanium or a halogen-containing compound of titanium, (3) an oxygen-containing organic compound of zirconium or a halogen-containing compound of zirconium and (4) an organoaluminum halide compound. (Japanese Patent Publication No. 8083/1980)

Catalyst systems consisting of an organometal compound and a solid catalyst component obtained by reacting (1) a solid component obtained by reacting a reaction product between (a) a hydropolysiloxane and a silicon compound wherein organic groups and hydroxyl groups are bonded to the silicon atom and (b) a Grignard reagent, with a halogen-containing compound of titanium or vanadium, with (2) a halogen- or alkoxy-containing organoaluminum compound. (Japanese Patent Publication No. 7443/1980).

These catalyst systems, however, are not fully satisfactory industrially in activity, powder characteristic of polymer obtained, etc. Further, these catalyst systems, except those disclosed in Japanese Patent Publication Nos. 39714/1977 and 8083/1980, produce only polymers of narrow molecular weight distribution.

The present inventors made extensive research on olefin polymerization catalysts capable of producing polymers of wide molecular weight distribution and free from the previously mentioned drawbacks. As a result, the present invention has been achieved.

That is, there is provided by the present invention a solid catalyst component for olefin polymerization which is produced by reacting (A) a silicon compound with (B) a compound of transition metal of Groups IVa, Va and VIa of the periodic table to obtain a reaction mixture (I), reacting the reaction mixture (I) with (C) an organomagnesium compound selected from organomagnesium compounds or hydrocarbon-soluble complexes between an organomagnesium compound and an organometal compound capable of allowing said organomagnesium compound to be soluble in hydrocarbons to obtain an intermediate product (II), and contacting the intermediate product (II) with (D) an organoaluminum halide compound represented by the general formula $R_c^1AlX_{3-c}$ (wherein $R^1$ is an organic group containing 1 to 20 carbon atoms, X is a halogen and c is a number defined by $0 < c < 3$) and (E) an oxidative compound.

As the silicon compound used as the component (A) in the present invention, there are mentioned, for example, (1) halogen-containing silicon compounds, (2) silicon compounds having a monomer unit $—SiR^2R^3O—$ (wherein $R^2$ and $R^3$ may be same or different, $R^2$ is an alkyl group, an aryl group, a cycloalkyl group, an alkoxy group, an aryloxy group or a halogen atom and $R^3$ is an alkyl group, an aryl group, a cycloalkyl group, a hydrogen atom or a halogen atom) and a polymerization degree of 2 to 10,000, (3) silanols represented by the general formula $R^4{}_l Si(OH)_{4-l}$ (wherein $R^4$ is an alkyl group, an aryl group, a cycloalkyl group or a hydrogen atom and l is 1, 2 or 3) or condensation products of said silanols, (4) silicon compounds represented by the general formula $R_m{}^5Si(OR^6)_{4-m}$ (wherein $R^5$ is an alkyl group, an aryl group, a cycloalkyl group, an alkenyl group or a hydrogen atom, $R^6$ is an alkyl group, an aryl group or a fatty acid moiety and m is 1, 2 or 3), and (5) silicon compounds or polymers represented by the general formula $[SiO_a(OR^7)_b]_n$ (wherein $R^7$ is an alkyl group, a cycloalkyl group, an aralkyl group, an aryl group or a fatty acid moiety, a is a number defined by $0 \leq a \leq 1$, b is a number defined by $2 \leq b \leq 4$, and n is a number of 1 to 10,000).

Examples of the component [(A)-(1)] include (a) halogen-containing silicon compounds represented by the general formula $R_lSi(OR')_mH_nX_x$ (wherein R is an alkyl group, an aryl group or an alkenyl group, R' is an alkyl group, an aryl group or a fatty acid moiety, X is a halogen atom, l, m and n are numbers defined by $0 \leq l \leq 3$, $0 \leq m \leq 3$, $0 \leq n \leq 3$, x is a number defined by $1 \leq x \leq 4$, and l,m,n and x satisfy a condition of $l+m+n+x=4$) such as $SiCl_4$, $CH_3SiCl_3$, $C_6H_5SiCl_3$, $CH_3SiCl_2H$, $SiHCl_3$, $Si(OC_2H_5)Cl_3$ and the like, (b) chlorosiloxanes represented by the general formula $Si_nO_{n-1}Cl_{2n+2}$ (wherein n is a number defined by $2 \leq n \leq 7$) such as $Si_2OCl_6$ and the like, and (c) polysilane halides represented by the general formula $Si_nX_{2n+2}$ (wherein X is a halogen atom and n is a number defined by $2 \leq n \leq 6$) such as $Si_4Cl_{10}$ and the like. Among these compounds, $SiCl_4$ is used most preferably.

Examples of the component [(A)-(2)] include hexamethyldisiloxane, tetramethyldisiloxane, trimethylcyclotrisiloxane, dimethylpolysiloxane, diphenylpolysiloxane, methylhydropolysiloxane, phenylhydropolysiloxane, chlorophenylpolysiloxane and ethoxyhydropolysiloxane. These polymers may have a chain, cyclic or network structure. It is preferable from an operational reason that these polymers be liquids having a viscosity at 25° C. of 1 to 10,000 centistokes, preferably 1 to 1,000 centistokes. However, the polymers may be solids.

Examples of the component [(A)-(3)] include $(CH_3)_3SiOH$, $(C_2H_5)_3SiOH$, $(C_6H_5)_3SiOH$, $(C_6H_5)_2Si(OH)_2$ and polysilanols.

Examples of the component [(A)-(4)] include $CH_3Si(OCH_3)_3$, $CH_3Si(OC_2H_5)_3$, $CH_3CH_2CH_2Si(OCH_3)_3$, $C_6H_5Si(OCH_3)_3$, $(CH_3)_2Si(OCH_3)_2$ and $CH_3Si(OCOCH_3)_3$.

Examples of the component [(A)-(5)] include $Si(OCH_3)_4$, $Si(OC_2H_5)_4$, $Si(OC_3H_7)_4$, $Si(OC_4H_9)_4$, $Si(OC_6H_5)_4$, tetraacetoxysilane, dimethoxypolysiloxane, diethoxypolysiloxane and diphenoxypolysiloxane. These polymers may have a chain, cyclic or network structure. It is preferable from an operational reason that these polymers be liquids having a viscosity at 25° C. of 1 to 10,000 centistokes, preferably 1 to 1,000 centistokes. However, the polymers may be solids.

As the compound of transition metal ($M^1$) of Groups IVa, Va and VIa of the periodic table used as the component (B), there can be mentioned compounds represented by the general formula $[M^1O_p(OR^8)_qX_r]_d$ (wherein $R^8$ is an organic group containing 1 to 20 carbon atoms, X is a halogen atom, p is a number defined by $0 \leq p \leq 1.5$, q is a number defined by $0 \leq q \leq 4$, r is a number defined by $0 \leq r \leq 4$ and d is an integer). The compounds of the said formula in which $0 \leq p \leq 1$ and $1 \leq d \leq 10$ are preferred. $R^8$ may be saturated or unsaturated and may contain atoms such as halogen, silicon, oxygen, nitrogen, sulfur, phosphorus and the like. It is preferable that $R^8$ be selected particularly from alkyl groups, cycloalkyl groups, aryl groups, aralkyl groups, alkenyl groups, acyl groups and their derivatives. It is preferable that $M^1$ be selected from titanium, vanadium, zirconium and hafnium.

Specific Examples of the component (B) include Ti(OC$_2$H$_5$)$_4$, Ti(O—n—C$_3$H$_7$)$_4$, Ti(O—i—C$_3$H$_7$)$_4$, Ti(O—n—C$_4$H$_9$)$_4$, Ti(O—sec—C$_4$H$_9$)$_4$, Ti(O—t—C$_4$H$_9$)$_4$, Ti(OC$_6$H$_5$)$_4$, Ti(OC$_6$H$_4$CH$_3$)$_4$, Ti(OC$_6$H$_4$Cl)$_4$, TiO(OC$_2$H$_5$)$_2$,

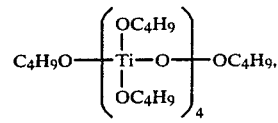

TiOCl$_2$, Ti(OC$_2$H$_5$)$_3$Cl, Ti(OC$_2$H$_5$)$_2$Cl$_2$, Ti(OC$_2$H$_5$)Cl$_3$, Ti(OC$_6$H$_5$)Cl$_3$, TiCl$_4$, TiBr$_4$, Zr(OC$_2$H$_5$)$_4$, Zr(O—n—C$_3$H$_7$)$_4$, Zr(O—i—C$_3$H$_7$)$_4$, Zr(O—n—C$_4$H$_9$)$_4$, Zr(O—sec—C$_4$H$_9$)$_4$, Zr(O—t—C$_4$H$_9$)$_4$, Zr(OC$_6$H$_5$)$_4$, Zr(OC$_6$H$_4$CH$_3$)$_4$, Zr(OC$_6$H$_4$Cl)$_4$, ZrO(OC$_2$H$_5$)$_2$,

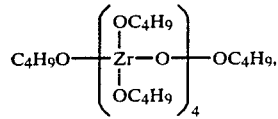

ZrOCl$_2$, Zr(OC$_2$H$_5$)$_3$Cl, Zr(OC$_2$H$_5$)$_2$Cl$_2$, Zr(OC$_2$H$_5$)Cl$_3$, ZrCl$_4$, ZrBr$_4$, VOCl$_3$, VCl$_4$, VO(OC$_2$H$_5$)$_3$, VO(O—i—C$_3$H$_7$)$_3$, VO(O—n—C$_4$H$_9$)$_3$, VO(O—i—C$_4$H$_9$)$_3$ and HfCl$_4$. Of these compounds, especially prefered are those of the above formula in which $r=0$.

The component (B) may be a mixture of a plurality of compounds. By using as the component (B) a mixture of a plurality of compounds of different transition metals ($M^1$), there can be obtained a solid catalyst component for olefin polymerization capable of providing polymers of wider molecular weight distribution. As the transition metals ($M^1$), a combination of Ti and Zr is particularly preferable. At this time, the atomic ratio of Ti to Zr is desired to be 1:50 to 50:1, preferably 1:20 to 20:1, more preferably 1:10 to 10:1, from the standpoint of obtaining a solid catalyst component capable of providing polymers of wider molecular weight distribution.

As the component (C), there can be used any organomagnesium compound containing magnesium-carbon linkages. Particularly preferable are Grignard compounds represented by the general formula $R^9MgX$ (wherein $R^9$ is a hydrocarbon group of 1 to 20 carbon atoms and X is a halogen) as well as magnesium compounds represented by the general formula $R^{10}R^{11}Mg$ (wherein $R^{10}$ and $R^{11}$ each are a hydrocarbon group of 1 to 20 carbon atoms). $R^{10}$ and $R^{11}$ may be same or different and are alkyl groups of 1 to 20 carbon atoms, aryl groups, aralkyl groups and alkenyl groups, $R^{10}$ and $R^{11}$ specifically are methyl, ethyl, n-propyl, iso-propyl, n-butyl, sec-butyl, tertbutyl, n-amyl, iso-amyl, n-hexyl, n-octyl, 2-ethylhexyl, phenyl, benzyl, etc.

Specific examples of the Grignard compounds include methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, n-amylmagnesium chloride, iso-amylmagnesium chloride, phenylmagnesium chloride and phenylmagnesium bromide. Specific examples of the magnesium compounds represented by the general formula $R^{10}R^{11}Mg$ include diethylmagnesium, di-n-propylmagnesium, di-iso-propylmagnesium, di-n-butylmagnesium, di-sec-butylmagnesium, di-tert-butylmagnesium, n-butyl-sec-butylmagnesium, di-n-amylmagnsium and diphenylmagnesium.

As the organomagnesium compound as the component (C), there may also be used alkyl- or arylmagnesium alkoxides or aryloxides.

In synthesis of the above mentioned organomagnesium compounds, there can be used an ethereal solvent such as diethyl ether, di-n-propyl ether, di-iso-propyl ether, di-n-butyl ether, di-iso-butyl ether, di-n-amyl ether, di-iso-amyl ether, di-n-hexyl ether, di-n-octyl ether, diphenyl ether, dibenzyl ether, phenetole, anisole, tetrahydrofuran, tetrahydropyran or the like. There may also be used a hydrocarbon solvent such as hexane, heptane, octane, cyclohexane, methylcyclohexane, benzene, toluene, xylene or the like, or a mixed solvent of an ether and a hydrocarbon. The organomagnesium compounds are preferably used in the form of ether solution or ether complex. For this ether, there is advantageously used an ether compound containing within the molecular at least 6 carbon atoms or a cyclic structure because such an ether compound can provide a solid catalyst component of almost spherical or ellipsoidal shape and narrow particle size distribution. Use of a Grignard compound represented by $R^9MgCl$ in the form of an ether solution or a complex with an ether is particularly preferable.

As the component (C), there may also be used a hydrocarbon-soluble complex between one of the above mentioned organomagnesium compound and an organometal compound capable of allowing said organomagnesium compound to be soluble in hydrocarbons. As examples of the organometal compound, there are cited organic compounds of Li, Be, B, Al and Zn.

As the component (D), there are used organoaluminum halide compounds represented by the general formula $R^1_cAlX_{3-c}$ (wherein $R^1$ is an organic group of 1 to 20 carbon atoms, preferably 1 to 6 carbon atoms, preferably a hydrocarbon group, X is a halogen and c is a number defined by $0 < c < 3$). X is preferred to be particularly chlorine. c is preferably $1 \leq c \leq 2$, more preferably 1. $R^1$ is preferably selected from alkyl, cycloalkyl, aryl, aralkyl and alkenyl groups.

As examples of the component (D), there are mentioned ethylaluminum dichloride, isobutylaluminum dichloride, ethylaluminum sesquichloride, isobutylaluminum sesquichloride, diethylaluminum monochloride, diisobutylaluminum monochloride, etc. Of these, particularly preferable are alkylaluminum dichlorides such as ethylaluminum dichloride, isobutylaluminum dichloride and the like.

As the component (D), there may also be used a combination of different organoaluminum halides. At this time, for control of halogen amount, there may be added to the organoaluminum halides a trialkylaluminum such as triethylaluminum, triisobutylaluminum or the like or a trialkenylaluminum.

As the component (E), there are used, for example, (1) mixed gases containing molecular oxygen, (2) organic peroxides capable of forming an oxygen radical and (3) oxidative halides. Examples of (1) include mixed gases comprising oxygen or ozone and an inert gas at an optional proportion. The inert gas may be nitrogen, argon, helium or the like. Examples of (2) include benzoyl peroxide, lauroyl peroxide, cumene peroxide, t-butyl peroxide, etc. Examples of (3) include chlorine, bromine, iodine and bromine chloride. For the component (E), the above compounds can be used individually or in combination.

Each step of synthesis of the solid catalyst component of the present invention is conducted in an inert gas atmosphere such as nitrogen, argon or the like, except a step of contact with an oxidative compound [the component (E)]. A reaction between a silicon compound [the component (A)] and a compound of a transition metal of Groups IVa, Va and VIa of the periodic table [the component (B)] is ordinarily conducted at a temperature of $-50°$ to $150°$ C. for several minutes to several hours. Each material is used as it is or after being dissolved in or diluted with an appropriate solvent. The method of adding the component (A) and the component (B) is optional and there can be used any of a method of adding the component (B) to the component (A), a method of adding the component (A) to the component (B) and a method of adding the two components simultaneously. The reaction ratio of the component (A) to the component (B) is 1:50 to 50:1, preferably 1:20 to 20:1, more preferably 1:2 to 2:1 in terms of the atomic ratio of silicon atom of the component (A) to transition metal ($M^1$) atom of the component (B). As the solvent used in this reaction, there are mentioned, for example, aliphatic hydrocarbons such as pentane, hexane, heptane, octane and the like, aromatic hydrocarbons such as benzene, toluene, xylene, chlorobenzene and the like, alicyclic hydrocarbons such as cyclohexane, cyclopentane and the like, and ether compounds such as diethyl ether, dibutyl ether, tetrahydrofuran and the like. These solvents are used individually or in combination. The reaction mixture (I) thus obtained is ordinarilly in the form of uniform solution but occasionally contains components insoluble in the solvent used.

Next, the reaction mixture (I) is reacted with an organomagnesium compound [the component (C)] to obtain an intermediate product (II). In this reaction, both the reaction mixture (I) and the component (C) are used as they are or after each being dissolved in or diluted with an appropriate solvent. The reaction is ordinarilly conducted at a temperature of $-70°$ to $150°$ C., preferably $-30°$ to $50°$ C. for several minutes to several hours, preferably 30 minutes to 5 hours. The method of adding the reaction mixture (I) and the component (C) is optional and there can be used any of a method of adding the component (C) to the reaction mixture (I), a method of adding the reaction mixture (I) to the component (C) and a method of adding the reaction mixture (I) and the component (C) simultaneously. The reaction ratio of the reaction mixture (I) to the component (C) is 1:10 to 10:1, preferably 1:5 to 5:1, more preferably 1:2 to 2:1 in terms of the atomic ratio of the sum of silicon atom and transition metal atom of the reaction mixture (I) to magnesium atom of the component (C). As the solvent used in this reaction, there are mentioned, for example, aliphatic hydrocarbons such as pentane, hexane, heptane, octane and the like, aromatic hydrocarbons such as benzene, toluene, xylene and the like, alicyclic hydrocarbons such as cyclohexane, cyclopentane and the like, and ether compounds such as diethyl ether, dibutyl ether, tetrahydrofuran, dioxane and the like. These solvents are used individually or in combination. The intermediate product (II) thus obtained is ordinarilly in the form of solid insoluble in the solvent used but occasionally in the form of solution depending upon the kinds of material compounds and the solvent used. In the latter case, the intermediate product (II) may be separated as a solid, prior to the subsequent step, by a method such as a liberating agent, precipitation due to temperature change, solvent evaporation, reprecipitation or the like.

The intermediate product (II) is contacted with the component (D) or the component (E) as it is, or after drying, or after filtration and drying, or after filtration and thorough solvent washing. The contact between the intermediate product (II) and the component (D) or (E) is preferably conducted in a sequence wherein the intermediate product (II) and the component (E) are contacted and the resulting reaction product (III) is contacted with the component (D), or in a sequence wherein the intermediate product (II) and the component (D) are contacted and the resulting hydrocarbon-insoluble product (IV) is contacted with the component (E).

In the contact between the intermediate product (II) or the reaction product (III) with the component (D), each material is used as it is or after being dissolved in or diluted with an appropriate solvent. This contact is ordinarily conducted at a temperature of −70° to 200° C., preferably −30° to 150° C., more preferably 30° to 100° C. for several minutes to several hours. The method of adding the intermediate product (II) or the reaction product (III) and the component (D) is optional and there can be used any of a method of adding the component (D) to the intermediate product (II) or the reaction product (III), a method of adding the intermediate product (II) or the reaction product (III) to the component (D) and a method of adding the intermediate product (II) or the reaction product (III) and the component (D) simultaneously. The reaction ratio of the intermeidate product (II) or the reaction product (III) and the component (D) can be selected in a wide range. By varying this reaction ratio, the molecular weight distribution of polymer obtained can be controlled. In general, by increasing the reaction ratio of the component (D) to the intermediate product (II) or the reaction product (III), the molecular weight distribution can be widened. Ordinarily, the component (D) is preferably used in an amount of 0.01 to 0.1 gram equivalent in terms of halogen atom contained in the component (D), per 1 g of the intermediate product (II) or the reaction product (III). As the solvent used in this reaction, thre are mentioned, for example, aliphatic hydrocarbons such as pentane, hexane, heptane, octane and the like, halogenated hydrocarbons such as carbon tetrachloride, dichloroethane and the like, aromatic hydrocarbons such as benzene, toluene, xylene, chlorobenzene and the like, and alicyclic hydrocarbons such as cyclohexane, cyclopentane and the like. These solvents are used individually or in combination. In this way, the hydrocarbon-insoluble product (IV) or a final solid catalyst component is obtained.

The reaction between the intermediate product (II) or the hydrocarbon-insoluble product (IV) and the component (E) can be conducted in various methods. It is conducted, for example, by a method wherein the intermediate product (II) or the hydrocarbon-insoluble product (IV) is dissolved or suspended in an appropriate solvent and then an oxidative compound [the component (E)] is passed through or dissolved in the solution or suspension and thereby the intermediate product (II) or the hydrocarbon-insoluble product (IV) is contacted with the component (E), or by a method wherein the intermediate product (II) or the hydrocarbon-insoluble product (IV) is contacted with the component (E) in an atmosphere containing a gaseous oxidant, in a dry state. This reaction is ordinarily conducted at a temperature of −70° to 150° C., preferably −30° to 80° C. for several minutes to several tens hours, preferably 30 minutes to 10 hours. The reaction ratio of the intermediate product (II) or the hydrocarbon-insoluble product (IV) and the component (E) can be selected in a wide range. Usually, the extent of oxidizing the transition metal compound can be controlled by the reaction time and the amount of oxidative compound used. The amount of oxidative compound used is 0.1 to 100 moles, preferably 0.2 to 50 moles relative to 1 mole of transition metal of the intermediate product (II) or the hydrocarbon-insoluble product (IV). In general, by increasing the reaction ratio of the oxidative compound to the intermediate product (II) or the hydrocarbon-insoluble product (IV), the molecular weight distribution of polymer obtained can be widened. As the solvent used in this reaction, there can be mentioned, for example, aliphatic hydrocarbons such as pentane, hexane, heptane, octane, and the like, halogenated hydrocarbons such as carbon tetrachloride, dichloethane and the like, and aromatic hydrocarbons such as benzene, toluene, xylene, chlorobenzene and the like. These solvents are used individually or in combination. In this way, the reaction product (III) or a final solid catalyst component is obtained.

By the reaction between the intermediate product (II) or the hydrocarbon-insoluble product (IV) and the component (E), the valency of the transition metals of Groups IVa, Va and VIa of the periodic table can be controlled. This serves to enhance the activity of the solid catalyst component of the present invention and widen the molecular weight distribution of a polymer obtained with the catalyst component.

The final solid catalyst component thus obtained is a powder of almost spherical or ellipsoidal form, narrow particle size distribution, large bulk dnesity and good flowability. This solid catalyst component contains magnesium, transition metal of Groups IVa, Va and VIa of the periodic table and halogen element(s). It generally shows a non-crystallinity or a very weak crystallinity. In X-ray diffraction, it often gives little peaks or very broad or weak peaks at around lattice distances, d, of 5.9, 2.8 and 1.8 Å.

The final solid product obtained by contacting the intermediate product (II) with the component (D) and the component (E) is ordinarily filtered, thoroughly washed with a hydrocarbon diluent and used as an olefin polymerization catalyst compoonent as it is or after drying.

Prior to practice of olefin polymerization with the catalyst of the present invention, preliminary polymerization or copolymerization of a small amount of an olefin (ethylene, and α-olefin of 3 to 10 carbon atoms or the like) may be conducted according to the known method, by the co-use of the intermediate product (II), the reaction product (III), the hydrocarbon-insoluble product (IV) or the final solid catalyst component and an organometal compound of metal of Groups I, II and III of the periodic table. The preliminary polymerization is preferably conducted in the presence of a slight amount of hydrogen. The temperature of preliminary polymerization is preferably room temperature to 100° C., more preferably room temperature to 50° C. The amount of prepolymer formed is preferably 0.05 to 20 g, more preferably 0.1 to 10 g, relative to 1 g of the intermediate product (II), the reaction product (III), the hydrocarbon-insoluble product (IV) or the final solid catalyst component.

In olefin polymerization reaction, there is used a catalyst system consisting of the final solid catalyst component obtained above and an organometal compound of metal of Groups I, II and III of the periodic table. As the organometal compound, there are mentioned organoaluminum compounds such as trialkylaluminums (triethylaluminum, tri-n-propylaluminum, tri-n-butylaluminum, triisobutylaluminum, tri-n-hexylaluminum, etc.), dialkylaluminum monohalides (diethylaluminum monochloride, di-n-propylaluminum monochloride, di-n-butylaluminum monochloride, diisobutylaluminum monochloride, di-n-hexylaluminum monochloride, etc.), alkylaluminum dihalides (ethylaluminum dichloride, n-propylaluminum dichloride, n-butylaluminum dichloride, isobutylaluminum dichloride, n-hexylaluminum etc.), alkylaluminum sesquihalides (ethylaluminum sesquichloride, n-propylaluminum sesquichloride, n-butylaluminum sesquichloride, isobutylaluminum sesquichloride, n-hexylaluminum sesquichloride, etc.), trialkenylaluminums (triisoprenylaluminum, etc.), alkoxyaluminums (diethylaluminum ethoxide, dibutylaluminum butoxide, ethylaluminum sesquiethoxide, butylaluminum sesquibutoxide, etc.), alkoxyaluminum halides (ethylaluminum ethoxychloride, butylaluminum butoxychloride, etc.), alkylaluminum hydrides (diethylaluminum hydride, dibutylaluminum hydride, ethylaluminum dihydride, butylaluminum dihydride, etc.) and the like; organozinc compounds such as diethylzinc and the like; organomagnesium compounds such as diethylmagnesium, ethylmagnesium chloride and the like; $LiAl(C_2H_5)_4$; and so forth. Of these, particularly preferable are trialkylaluminums, alkylaluminum halides and their mixtures.

As olefins to which the solid catalyst component of the present invention can be applied, there are mentioned olefins of 2 to 20 carbon atoms, preferably 2 to 10 carbon atoms and having an unsaturation at the end, such as ethylene, propylene, butene-1, 4-methylpentene-1, hexene-1, octene-1 and the like.

The solid catalyst component of the present invention can also be used for copolymerization of two or more of the above mentioned olefins and further for copolymerization of one of these olefins with a diolefin of 4 to 20 carbon atoms. As examples of the diolefin, there can be mentioned 1,4-hexadiene, 1,7-octadiene, vinylcyclohexene, 1,3-divinylcyclohexene, cyclopentadiene, 1,5-cyclooctadiene, dicyclopentadiene, norbornadiene, 5-vinylnorbornene, ethyldienenorbornene, butadiene, isoprene, etc.

The solid catalyst component of the present invention can effectively be applied particularly for production of ethylene homopolymers or ethylene copolymers consisting of at least 90% of ethylene and the rest of another olefin (particularly propylene, butene-1, 4-methylpentene-1, hexene-1 or octene-1).

In olefin polymerization with the solid catalyst component of the present invention, an electron-donating compound and the like may be added for purposes of control of molecular weight distribution, etc. As the electron-donating compound, there can be used known substances such as compounds containing nitrogen, oxygen and phosphorus.

Polymerization reaction with the present invention can be conducted by known methods such as slurry polymerization, gas phase polymerization, solution polymerization, melt polymerization and the like. In slurry or gas phase polymerization, there is obtained a polymer powder of almost spherical or ellipsoidal shape, narrow particle size distribution, large bulk density and good flowability in conformity with good particle characteristic of the solid catalyst component of the present invention.

In slurry or gas phase polymerization, it is generally desirable that the polymerization temperature be room temperature to 100° C., preferably 40° to 95° C. and the polymerization pressure be normal pressure to 100 atm, preferably normal pressure to 50 atmosphers. In solution or melt polymerization, it is desirable that the polymerization temperature be 80° to 300° C., preferably 120° to 280° C. and the polymerization pressure be normal pressure to 2,000 atm, preferably 30 to 1,500 atmosphers. Both the polymerization temperature and the polymerization pressure are not restricted to the above ranges and a higher temperature or a higher pressure may be employed. Further, as a molecular weight-controlling agent, there can be used, for example, hydrogen. Polymerization can be conducted both continuously and batchwise. In olefin polymerization with the solid catalyst component of the present invention, multistage polymerization may be adopted by combining multiple reaction zones each different in polymerization condition.

In polymerization with the solid catalyst component of the present invention, the concentration of solid catalyst component in polymerization system is generally sufficient to be 0.001 to 1 millimole as transition metal atom per 1 liter of solvent or polymerization vessel capacity. The amount of organometal compound catalyst component used in combination with the solid catalyst component can be varied in a wide range but ordinarily is 0.5 to 500 mole equivalents, preferably 2 to 100 mole equivalents per 1 mole of transition metal atom contained in the solid catalyst component.

As the polymerization solvent used in slurry polymerization, solution polymerization, etc., there are mentioned inert solvents such as aliphatic hydrocarbons (propane, butane, pentane, hexane, heptane, octane, etc.), alicyclic hydrocarbons (cyclohexane, cycloheptane, etc.) and the like. It is possible to use polymerization monomers such as ethylene, propylene, butene-1, 4-methylpenetene-1, hexene-1, octene-1 and the like also as a polymerization solvent.

In olefin polymerization with the present solid catalyst component, because the catalyst has high activities per transition metal and per solid catalyst, the amount of catalyst remaining in polymer formed is small and accordingly a step of catalyst removal from polymer can be omitted. Further, polymer build-up on the wall of polymerization vessel during polymerization is small and, in slurry or gas phase polymerization, there is obtained a polymer powder of narrow particle size distribution, almost spherical or ellipsoidal shape, large bulk density and good fluidity and a step of pelletization can be eliminated. Thus, polymerization and operation efficiencies are very high in olefin polymerization with the solid catalyst component of the present invention. Furthermore, the molecular weight distribution of polymer formed can be optionally controlled by proper selection of the kind and the amount of each component used in the production of solid catalyst component. This enables production of polymers suitable for a variety of applications such as injection molding, rotation molding, extrusion molding, film extrusion, blow molding and the like.

The present invention will be explained in more detail by way of Examples. However, the present invention is not restricted by these Examples.

In Examples, polymer properties were measured in accordance with the following methods.

Density was measured in accordance with JIS K 6760.

Bulk density was measured in accordance with JIS K 6721.

As a yardstick for melt-flow property, MFR (melt flow ratio) was used, MFR is the ratio of a melt index when a load of 21.60 kg of applied to a melt index when a load of 2.160 kg is applied. (The melt index is measured in accordance with ASTM 1238-57T.)

$$MFR = \frac{\text{Melt index when a load of 21.60 kg is applied}}{\text{Melt index when a load of 2.160 kg is applied}}$$

It is generally known that a polymer of wider moledular weight distribution gives a larger value of MFR.

EXAMPLE 1

(1) Synthesis of organomagnesium compound

In a 1 liter flask equipped with a stirrer, a reflux condenser, a dropping funnel and a thermometer, there was placed 32.0 g of magnesium chips. The gas in the flask was thoroughly replaced with nitrogen to remove air and moisture. To the dropping funnel, there were fed 120 g of n-butyl chloride and 500 ml of di-n-butyl ether. About 30 ml of this mixture was dropped into the flask to start reaction. After start of reaction, dropping of the mixture was continued over a period of about 4 hours at 50° C. After completion of dropping, reaction was continued for 1 hour at 60° C. Then, the reaction mixture was cooled down to room temperature and the solid was removed by filtration. The concentration of n-butyl-magnesium chloride dissolved in di-n-butyl ether was found to be 2.03 moles per liter by hydrolyzing the magnesium chloride dissolved in di-n-butyl ether with 1N sulfuric acid and backtitrating the residual sulfuric acid with 1N aqueous sodium hydroxide solution using phenolphthalein as an indicator.

(2) Synthesis of reaction mixture (I) and intermediate product (II)

5.0 g (14.6 mmole) of $Ti(O-n-C_4H_9)_4$ was dissolved in 150 ml of n-heptane. Thereto was added 43.6 ml of a n-heptane solution containing 72.9 mmole of $Zr(O-n-C_4H_9)_4$. The mixture was stirred at room temperature for 10 minutes. Thereto was added dropwise 20.0 g (90.0 mmole) of $Si(OC_2H_5)_4$ over a period of 15 minutes. Then, stirring was continued at room temperature for 20 minutes to obtain a light yellow, uniform solution [reaction mixture (I)].

This reaction mixture (I) was cooled to 5° C. To the mixture being kept at 5° C. was added dropwise over a period of 35 minutes 93.0 ml of the di-n-butyl ether solution containing 189 mmole of $n-C_4H_9MgCl$ prepared in the above (1). With dropping, the reaction mixture turned brown and a solid was formed. After completion of dropping, the reaction was continued at room temperature for 2 hours. Then, the liquid phase was removed by filtration and the solid was subjected to 5 times of washing and filtration with 350 ml of n-heptane. Subsequently, the solid was dried under reduced pressure at room temperature to obtain 41.4 g of a brown powder [intermediate product (II)]. Upon analysis, this powder contained 1.8% by weight of Ti, 17.8% by weight of Zr, 11.6% by weight of Mg, 16.1% by weight of Cl and 0.7% by weight of $(n-C_4H_9)_2O$. The valencies of Ti and Zr were 3, respectively.

(3) Synthesis of reaction product (III)

To 10.0 g of the intermediate product (II) prepared in the above (2) was added 100 ml of n-heptane. Through the mixture being stirred at room temperature, a dry gas comprising 10% of oxygen and 90% of nitrogen was passed for 2 hours at a rate of 12 l/h, whereby reaction was allowed to take place. After completion of the reaction, the liquid phase was removed by filtration and the solid was subjected to 5 times of washing and filtration with 100 ml of n-heptane. Subsequently, the solid was dried under reduced pressure at room temperature to obtain 9.1 g of a light yellow powder [reaction product (III)]. Upon analysis, most of Ti and Zr had a valency of 4, respectively.

(4) Synthesis of solid catalyst component

To 5.0 g of the reaction product (III) prepared in the above (3) was added 18 ml of n-heptane. Thereto was added dropwise 36.1 ml of a n-heptane solution containing 125 mmole of $C_2H_5AlCl_2$ at 60° C. in 30 minutes. After completion of dropping, reaction was continued at 65° C. for 1 hour. After completion of the reaction, the liquid phase was removed by filtration and the solid was subjected to 5 times of washing and filtration with 50 ml of n-heptane. Subsequently, the solid was dried under reduced pressure at room temperature to obtain 2.8 g of a brown powder.

Upon analysis, the powder contained 2.0% by weight of Ti, 18.2% by weight of Zr, 13.0% by weight of Mg, 62.1% by weight of Cl and 3.2% by weight of Al. Ti and Zr had a valency of 3, respectively.

In X-ray diffraction, this powder showed only very weak and broad peaks at around lattice distances of, d, 5.9, 2.8 and 1.8 Å. Microsopic observation indicated that the powder is almost spherical and has a narrow particle size distribution.

(5) Polymerization of ethylene

In an 1 liter autoclave equipped with an electromagnetic induction type stirrer whose inside was thoroughly replaced by nitrogen, there were placed 500 ml of n-heptane and 1.0 mmole of triisobutylaluminum. They were heated to 80° C. and hydrogen was added until the total pressure inside the autoclave became 5 kg/cm$^2$. Then, ethylene was added thereto until the total pressure reached 15 kg/cm$^2$. Further, 5.9 mg of the solid catalyst component prepared in the above (4) was added and polymerization was started. Polymerization was continued at 80° C. for 1 hour while keeping the total pressure constant by supplying ethylene continuously. After completion of polymerization, the polymer formed was collected by filtration and dried under reduced pressure at 60° C. The yield of polymer was 63.2 g. The catalyst activity was 10,700 g polymer per g solid catalyst per hr and 53,000 g polymer per g transition metal per hr. The polymer had a MI of 0.05 g per 10 minutes, a MFR of 135 and a bulk density of 0.39 g/cm$^3$. The polymer powder had an almost spherical shape, a narrow particle size distribution and good fluidity.

EXAMPLE 2

Ethylene polymerization was conducted in the same manner as in Example 1 (5), except that 1.0 mmole of triethylaluminum was used in place of 1.0 mmole of triisobutylaluminum and 5.4 mg of the solid catalyst component was used in place of 5.9 mg of the same solid catalyst component. 60.1 g of a polymer was obtained. The catalyst activity was 11,100 g polymer per g solid catalyst per hr and 55,000 g polymer per g transition metal per hr. The polymer had a MI of 0.07 g of 10 minutes, a MFR of 112 and a bulk density of 0.38 g/cm$^3$. The polymer powder had an almost spherical shape, a narrow particle size distribution and good fluidity.

EXAMPLE 3

(1) Synthetis of hydrocarbon-insoluble product (IV)

To 10 g of the intermediate product (II) prepared in Example 1 (2) was added 36 ml of n-heptane. Thereto was added dropwise 72.2 ml of a n-heptane solution containing 250 mmole of C$_2$H$_5$AlCl$_2$ at 60° C. over a period of 30 minutes. After completion of dropping, reaction was continued at 65° C. for 1 hour. After completion of the reaction, the liquid phase was removed by filtration and the solid was subjected to 5 times of washing and filtration with 100 ml of n-heptane. Subsequently, the solid was dried under reduced pressure at room temperature to obtain 5.2 g of a brown powder [product (IV)]. Upon analysis, this powder contained 2.2% by weight of Ti, 18.1% by weight of Zr, 8.9% by weight of Mg, 54.1% by weight of Cl and 3.1% by weight of Al. Ti and Zr had valencies of 2 and 3, respectively.

(2) Synthesis of solid catalyst component

In the same manner as in Example 1 (3) 5.0 g of the hydrocarbon-insoluble product (IV) prepared in the above (1) was reacted with the oxidative compound, whereby 4.8 g of a brown powder was formed. Upon analysis of this powder, the most parts of Ti and Zr had a valency of 3, respectively.

(3) Polymerization of ethylene

Ethylene polymerization was conducted in the same manner as in Example 1 (5), except that 8.1 mg of the solid catalyst component prepared in the above (2) was used in place of 5.9 mg of the solid catalyst component prepared in Example 1 (4). 65.4 g of a polymer was obtained. The catalyst activity was 8,070 g polymer per g solid catalyst per hr and 39,800 g polymer per g transition metal per hr. This polymer had a MI of 0.06 g per 10 minutes, a MFR of 130 and a bulk density of 0.39 g/cm$^3$. The polymer powder had an almost spherical shape, a narrow particle size distribution and good fluidity.

COMPARATIVE EXAMPLE 1

Ethylene polymerization was conducted in the same manner as in Example 1 (5), except that 16.1 mg of the intermediate product (II) prepared in Example 1 (2) was used as a solid catalyst component. Only a trace amount of a polymer was obtained.

COMPARATIVE EXAMPLE 2

Ethylene polymerization was conducted in the same manner as in Example 1 (5), except that 30.4 mg of the solid product prepared in Example 1 (3) was used as a solid catalyst component. Only a trace amount of a polymer was obtained.

COMPARATIVE EXAMPLE 3

(1) Synthesis of solid catalyst component

A reaction mixture (I) was obtained in the same manner as in Example 1 (2), except that the amount of each reagent was one third of that used in Example 1 (2). To this reaction mixture (I) was added dropwise 75.1 ml of n-heptane solution containing 260 mmole of C$_2$H$_5$AlCl$_2$ at 60° C. over a period of 30 minutes. After dropping, reaction was continued at 65° C. for 1 hour. After completion of the reaction, the liquid phase was removed by filtration and the solid was subjected to 5 times of washing and filtration with 70 ml of n-heptane. Subsequently, the solid was dried under reduced pressure at room temperature to obtain 8.1 g of a solid catalyst component. Upon analysis, this catalyst component contained 3.8% by weight of Ti and 25.4% by weight of Zr.

(2) Polymerization of ethylene

Ethylene polymerization was conducted in the same manner as in Example 1 (5), except that 25.3 mg of the solid product prepared in the above (1) was used as a solid catalyst component. 33.4 g of a polymer was obtained. The catalyst activity was 1,320 g polymer per g solid catalyst per hr and 4,520 g polymer per g transition metal per hr. This polymer had a MI of 0.07 g per 10 minutes, a MFR of 75 and a bulk density of 0.22 g/cm$^3$. Thus, the catalyst activity was low and the polymer powder was insufficient in bulk density and fluidity.

COMPARATIVE EXAMPLE 4

(1) Synthesis of solid catalyst component 3.5 g (10.3 mmole) of Ti(O—n—C$_4$H$_9$)$_4$ was dissolved in 30 ml of n-heptane. To this solution was added 32.0 ml of a n-heptane solution containing 51.2 mmole of Zr(O—n—C$_4$H$_9$)$_4$ and they were stirred at room temperature for 10 minutes. This mixture was cooled to 5° C. To the mixture being kept at 5° C. was added dropwise 30.3 ml of a di-n-butyl ether solution containing 61.5 mmole of n—$C_4H_9MgCl$ prepared in Example 1 (1) over a period of 30 minutes. With dropping, the reaction mixture turned brown and a solid was formed. After completion of dropping, reaction was continued at room temperature for 2 hours. The liquid phase was removed by filtration and the solid was subjected to 5 times of washing and filtration with 200 ml of n-heptane. Subsequently, the solid was dried under reduced pressure at room temperature to obtain 18.3 g of a brown powder. To 5.2 g of this brown powder was added 19 ml of n-heptane. Thereto was added dropwise 37.5 ml of a n-heptane solution containing 130 mmole of $C_2H_5AlCl_2$ at 60° C. over a period of 30 minutes. After dropping, reaction was continued at 65° C. for 1 hour. After completion of the reaction, the liquid phase was removed by filtration and the solid was subjected to 5 times of washing and filtration with 50 ml of n-heptane. Subsequently, the solid was dried under reduced pressure at room temperature to obtain 3.4 g of a brown powder. Upon analysis, this powder contained 3.6% by weight of Ti and 22.1% by weight of Zr.

(2) Polymerization of ethylene

Ethylene polymerization was conducted in the same manner as in Example 1 (5), except that 5.8 mg of the brown powder prepared in the above (1) was used as a solid catalyst component. 41.4 g of a polymer was obtained. The catalyst activity was 7,140 g polymer per g solid catalyst per hr and 27,800 g polymer per g transition metal per hr. Thus, the activity per transition metal was inferior. The polymer had a MI of 0.12 g per 10 minutes, a MFR of 85 and a bulk density of 0.26 g/cm$^3$. Thus, the polymer powder was insufficient in bulk density and fluidity.

COMPARATIVE EXAMPLE 5

(1) Synthesis of solid catalyst component

Using the same compounds as used in Example 1 (2) and (3) in the same quantitative ratio but employing a different synthesis procedure for intermeidate product (II), synthesis of solid catalyst component was conducted.

20.1 g (96.6 mmole) of $Si(OC_2H_5)_4$ was dissolved in 150 ml of n-heptane. To this solution being kept at 5° C. was added dropwise over a period of 35 minutes 93.0 ml of a di-n-butyl ether solution containing 189 mmole of n—$C_4H_9MgCl$ prepared in Example 1 (1). With dropping, a white solid was formed. After completion of dropping, reaction was continued at 5° C. for 1 hour. To this suspension being kept at 5° C. was added dropwise over a period of 30 minutes 100 ml of a n-heptane solution containing 14.6 mmole of Ti(O—n—$C_4H_9)_4$ and 72.9 mmole of Zr(O—n—$C_4H_9)_4$. With dropping, the liquid color turned brown. After completion of dropping, reaction was continued at room temperature for 2 hours. The liquid phase was removed by filtration and the solid was subjected to 5 times of washing and filtration with 300 ml of n-heptane. Subsequently, the solid was dried under reduced pressure at room temperature to obtain 35.8 g of a brown powder. Upon analysis, this powder contained 1.8% by weight of Ti and 16.9% by weight of Zr. To 5.7 g of this brown powder was added 20 ml of n-heptane. Thereto was added dropwise at 60° C. over a period of 30 minutes 41.2 ml of a n-heptane solution containing 143 mmole of $C_2H_5AlCl_2$. After completion of dropping, reaction was continued at 65° C. for 1 hour. After completion of the reaction, the liquid phase was removed by filtration and the solid was subjected to 5 times of washing and filtration with 60 ml of n-heptane. Subsequently, the solid was dried under reduced pressure at room temperature to obtain 3.2 g of a brown powder. Upon analysis, this powder contained 2.0% by weight of Ti and 17.9% by weight of Zr.

(2) Polymerization of ethylene

Ethylene polymerization was conducted in the same manner as in Example 1 (5), except that 8.2 mg of the brown powder prepared in the above (1) was used as a solid catalyst componenet. 38.8 g of a polymer was obtained. The catalyst activity was 4,730 g polymer per g solid catalyst per hr and 23,800 g polymer per g transition metal per hr. This polymer had a MI of 0.18 g per 10 minutes, a MFR of 72 and a bulk density of 0.23 g/cm$^3$. The polymer powder had a wide particle size distribution and was very poor in bulk density and fluidity.

EXAMPLE 4

In a 1 liter autoclave equipped with an electromagnetic induction type stirrer whose inside was thoroughly replaced by nitrogen, there were placed 200 g of butane, 1.0 mmole of triisobutylaluminum and 50 g of butene-1. The mixture was heated up to 70° C. Thereto was added hydrogen so that the total pressure became 5 kg/cm$^2$. Then, ethylene was added thereto so that the total pressure became 15 kg/cm$^2$. Further, 5.2 mg of the solid catalyst component prepared in Example 1 (4) was added, whereby polymerization was started. While supplying ethylene continuously to keep the total pressure constant, copolymerization between ethylene and butene-1 was conducted at 70° C. for 1 hour. After completion of the polymerization, the polymer formed was subjected to filtration and dried under reduced pressure at 60° C. The polymer yield was 65.1 g. The catalyst activity was 12,500 g polymer per g solid catalyst per hr and 61,900 g polymer per g transition metal per hr. This polymer contained 11.2 ethyl groups per 1,000 carbon atoms and had a density of 0.938 g/cm$^3$, a MI of 0.10 g per 10 minutes, a MFR of 111 and a bulk density of 0.37 g/cm$^3$. The polymer powder had an almost spherical shape, a narrow particle size distribution and good fluidity.

EXAMPLE 5

(1) Synthesis of reaction product (III)

Dry oxygen gas was directly passed through 10.0 g of the intermediate product (II) prepared in Example 1 (2). The oxygen flow rate was 10 l/hr at room temperature. Reaction was conducted for 2 hours. After completion of the reaction, the resulting reaction product was subjected to 5 times of washing and filtration with 100 ml of n-heptane, and dried under reduced pressure at room temperature to obtain 8.0 g of a light yellow powder. Upon analysis, Ti and Zr in the powder had a valency of 4, respectively.

(2) Synthesis of solid catalyst component 5.0 g of the reaction product prepared in the above (1) was subjected to reaction in the same manner as in Example 1 (4), whereby 2.6 g of a light brown powder was obtained. Upon analysis, the most parts of Ti and Zr in the powder had a valency of 3, respectively.

(3) Polymerization of ethylene

Ethylene polymerization was conducted in the same manner as in Example 1 (5), except that 5.7 mg of the light brown powder prepared in the above (2) was used as a solid catalyst component. 69.1 g of a polymer was obtained. The catalyst activity was 12,100 g polymer per g solid catalyst per hr and 56,100 g polymer per g transition metal per hr. The polymer had a MI of 0.05 g per 10 minutes, a MFR of 138 and a bulk density of 0.39 g/cm$^3$.

EXAMPLE 6

(1) Reaction with oxidative compound

To 10.0 g of the intermediate product (II) prepared in Example 1 (2) was added 50 ml of n-heptane. Thereto was added 2 g of lauroyl peroxide. The mixture was heated up to 70° C. and reaction was conducted at 70° C. for 1 hour. After completion of the reaction, the liquid phase was removed by filtration and the solid was subjected to 5 times of washing and filtration with 100 ml of n-heptane and dried under reduced pressure at room temperature to obtain 9.2 g of a light brown powder. Upon analysis, the most parts of Ti and Zr in the powder had a valency of 4, respectively.

(2) Synthesis of solid catalyst component 5.0 g of the reaction product prepared in the above (1) was subjected to reaction in the same manner as in Example 1 (4). 2.8 g of a light brown powder was obtained. Upon analysis, the most parts of Ti and Zr in the powder had a valency of 3, respectively.

(3) Polymerization of ethylene

Ethylene polymerization was conducted in the same manner as in Example 1 (5), except that 5.8 g of the light brown powder prepared in the above (2) was used as a solid catalyst component. 61.1 g of a polymer was obtained. The catalyst activity was 10,500 g polymer per g solid catalyst per hr and 51,200 g polymer per g transition metal per hr. This polymer had a MI of 0.06 g per 10 minutes, a MFR of 137 and a bulk density of 0.38 g/cm$^3$.

EXAMPLES 7 to 16

Using various raw material compounds and the procedures essentially same as in Example 1, synthesis of solid catalyst component as well as ethylene polymerization were conducted. Conditions for synthesis of solid catalyst component are shown in Table 1 and results of ethylene polymerization are shown in Table 2.

TABLE 1

| Example | Component (A) Kind | Component (A) Amount used (mole) | Component (B) Kind | Component (B) Amount used (mole) | Component (C) Kind (Polymerization solvent) | Component (C) Amount used (mole) | Reaction solvent | Reaction with component (E) Reaction time (hr) | Reaction with component (E) Reaction solvent | Component (D) Kind | Component (D) Amount used (mmole/g solid) | Reaction solvent |
|---|---|---|---|---|---|---|---|---|---|---|---|---|
| 7 | Si(O—n-Bu)$_4$ | 0.085 | Ti(O—n-Bu)$_4$ | 0.028 | n-BuMgCl | 0.17 | n-Heptane | 1 | n-Heptane | EtAlCl$_2$ | 20 | n-Heptane |
| 8 | " | " | Zr(O—n-Bu)$_4$ Ti(O—n-Bu)$_4$ | 0.057 0.028 | [(n-Bu)$_2$O] n-BuMgCl | " | " | 3 | " | " | " | " |
| 9 | " | " | Zr(O—n-Bu)$_4$ Ti(O—n-Bu)$_4$ | 0.057 0.057 | [(n-Bu)$_2$O] n-BuMgCl | " | " | 2 | " | " | " | " |
| 10 | " | " | Zr(O—n-Bu)$_4$ Ti(O—n-Bu)$_4$ | 0.028 0.008 | [(n-Bu)$_2$O] n-BuMgCl | " | " | " | " | " | " | " |
| 11 | " | " | Zr(O—n-Bu)$_4$ Ti(O—n-Bu)$_4$ | 0.077 0.077 | [(n-Bu)$_2$O] n-BuMgCl | " | " | " | " | " | " | " |
| 12 | " | " | Zr(O—n-Bu)$_4$ Ti(O—n-Bu)$_4$ | 0.008 0.028 | [(n-Bu)$_2$O] n-BuMgCl | " | " | 3 | " | " | 15 | " |
| 13 | Si(OC$_6$H$_5$)$_4$ | " | Zr(O—n-Bu)$_4$ Ti(O—n-Bu)$_4$ | 0.057 0.008 | [(n-Bu)$_2$O] (n-Bu)— (sec-Bu)Mg (n-Heptane) n-BuMgCl | " | Toluene | 2 | " | " | 30 | " |
| 14 | Diethoxy-polysiloxane | 0.090 | Zr(O—n-Bu)$_4$ Ti(O—n-Bu)$_4$ | 0.077 0.009 | (Tetrahydrofran) (n-Bu)— | 0.144 | " | " | Toluene | Et$_2$AlCl | " | " |
| 15 | SiCl$_4$ | 0.070 | Zr(O—n-Bu)$_4$ TiCl$_4$ | 0.045 0.012 | (sec-Bu)Mg (n-Heptane) n-BuMgCl | 0.140 | n-Heptane | 4 | n-Heptane | EtAlCl$_2$ | 17 | " |
| 16 | Si(OEt)$_4$ | " | Zr(O—n-Pr)$_4$ | 0.058 0.028 0.057 | [(n-Bu)$_2$O] | 0.170 | " | 3 | " | Et$_2$AlCl | 30 | " |

Note:
Et = C$_2$H$_5$,
n-Pr = n-C$_3$H$_7$,
n-Bu = n-C$_4$H$_9$,
sec-Bu = sec-C$_4$H$_9$

TABLE 2

| Example | Amount of solid catalyst component (mg) | Organometal compound | Polymer yield (g) | Catalyst activity g polymer/ g solid · hr | Catalyst activity g polymer/ g transition metal · hr | Bulk density (g/cm$^3$) | MI (g/ 10 min) | MFR |
|---|---|---|---|---|---|---|---|---|
| 7 | 6.3 | Triisobutyl-aluminum | 57.6 | 9,150 | 48,200 | 0.39 | 0.18 | 102 |
| 8 | 5.4 | Triisobutyl-aluminum | 65.3 | 12,100 | 63,700 | 0.38 | 0.08 | 132 |
| 9 | 2.8 | Triisobutyl-aluminum | 61.0 | 21,800 | 163,000 | 0.38 | 0.54 | 70 |
| 10 | 5.3 | Triisobutyl-aluminum | 48.3 | 9,120 | 43,800 | 0.40 | 0.03 | 149 |
| 11 | 3.1 | Triisobutyl-aluminum | 70.1 | 22,600 | 168,000 | 0.39 | 0.56 | 56 |
| 12 | 3.3 | Triisobutyl-aluminum | 47.2 | 14,300 | 82,500 | 0.39 | 0.27 | 75 |
| 13 | 6.1 | Triisobutyl-aluminum | 53.7 | 8,880 | 42,300 | 0.35 | 0.10 | 128 |
| 14 | 5.1 | Triisobutyl-aluminum | 49.6 | 9,720 | 69,400 | 0.35 | 0.09 | 124 |
| 15 | 5.8 | Triisobutyl-aluminum | 50.2 | 8,650 | 45,500 | 0.35 | 0.14 | 108 |
| 16 | 4.2 | Triisobutyl-aluminum | 47.5 | 11,300 | 58,700 | 0.38 | 0.11 | 121 |

What is claimed is:

1. A solid catalyst component for olefin polymerization which is produced by reacting (A) a silicon compound selected from the group consisting of (1) halogen-containing silicon compounds, (2) silicon compounds having a monomer unit —$SiR^2R^3O$— (wherein $R^2$ and $R^3$ may be same or different, $R^2$ is an alkyl group, an aryl group, a cycloalkyl group, an alkoxy group, or an aryloxy group and $R^3$ is an alkyl group, an aryl group, a cycloalkyl group, or a hydrogen atom and a polymerization degree of 2 to 10,000, (3) silanols represented by the general formula $R_l^4Si(OH)_{4-l}$ (wherein $R^4$ is an alkyl group, an aryl group, a cycloalkyl group or a hydrogen atom and l is 1, 2 or 3) or condensation products of said silanols, (4) silicon compounds represented by the general formula $R_m^5Si(OR^6)_{4-m}$ (wherein $R^5$ is an alkyl group, an aryl group, a cycloalkyl group, an alkenyl group or a hydrogen atom, $R^6$ is an alkyl group, an aryl group or a fatty acid moiety and m is 1, 2 or 3), and (5) silicon compounds or polymers represented by the general formula $[SiO_a(OR^7)_b]n$ (wherein $R^7$ is an alkyl group, a cycloalkyl group, an aryalkyl group, an aryl group or a fatty acid moiety, a is a number defined by $0 \leq a \leq 1$, b is a number defined by $2 \leq b \leq 4$, number of and n is a 1 to 10,000) with (B) a compound of a transition metal of Groups IVa, Va and VIa of the periodic table to obtain a reaction mixture (I), reacting the reaction mixture (I) with (C) an organomagnesium compound selected from organomagnesium compounds or hydrocarbon-soluble complexes between an organomagnesium compound and an organometal compound capable of allowing said organomagnesium compound to be soluble in hydrocarbons to obtain an intermediate product (II), and contacting the intermediate product (II) with (D) an organoaluminum halide compound represented by the general formula $R_c^1AlX_{3-c}$ (wherein $R^1$ is an organic group containing 1 to 20 carbon atoms, X is a halogen and c is a number defined by $0 < c < 3$) and (E) an oxidative compound.

2. A solid catalyst component for olefin polymerization according to claim 1, wherein the silicon compound [component (A)] is a tetraalkoxysilane or a tetraaryloxysilane.

3. A solid catalyst component for olefin polymerization according to claim 1, wherein the silicon compound [component (A)] is a silicon tetrachloride.

4. A solid catalyst component for olefin polymerization according to claim 1, wherein the silicon compound [component (A)] is a polysiloxane.

5. A solid catalyst component for olefin polymerization according to claim 1, wherein the compound of a transition metal of Groups IVa, Va and VIa of the periodic table [component (B)] is a compound represented by the general formula $[M^1O_p(OR^8)_qX_r]_d$ (wherein $R^8$ is an organic group containing 1 to 20 carbon atoms, X is a halogen atom, p is a number defined by $0 \leq p \leq 1.5$, q is a number defined $0 \leq q \leq 4$, r is a number defined by $0 \leq r \leq 4$ and d is an integer).

6. A solid catalyst component for olefin polymerization according to claim 5, wherein $M^1$ is an element selected from titanium, vanadium, zirconium and hafnium.

7. A solid catalyst component for olefin polymerization according to claim 5, wherein $M^1$ is an element selected from titanium and zirconium.

8. A solid catalyst component for olefin polymerization according to claim 5, wherein a combination of titanium and zirconium is used as the transition metal ($M^1$).

9. A solid catalyst component for olefin polymerization according to claim 8, wherein the atomic ratio of titanium to zirconium is from 1:50 to 50:1.

10. A solid catalyst component for olefin polymerization according to claim 8, wherein the atomic ratio of titanium to zirconium is from 1:20 to 20:1.

11. A solid catalyst component for olefin polymerization according to claim 8, wherein the atomic ratio of titanium to zirconium is from 1:10 to 10:1.

12. A solid catalyst component for olefin polymerization according to claim 1, wherein the organomagnesium compound [component (C)] is a compound represented by the general formula $R^9MgX$ (wherein $R^9$ is a hydrocarbon group of 1 to 20 carbon atoms and X is a halogen) as well as magnesium compounds represented by the general formula $R^{10}R^{11}Mg$ (wherein $R^{10}$ and $R^{11}$ each are a hydrocarbon group of 1 to 20 carbon atoms).

13. A solid catalyst component for olefin polymerization according to claim 12, wherein the component (C) is used in the form of a solution in an ether or a complex with an ether.

14. A solid catalyst component for olefin polymerization according to claim 13, wherein the ether has 6 or more carbon atoms or a cyclic structure.

15. A solid catalyst component for olefin polymerization according to claim 1, wherein the organoaluminum halide compound [component (D)] is an alkylaluminum dichloride represented by the general formula $R^1AlCl_2$ (wherein $R^1$ is an alkyl group having 1 to 20 carbon atoms).

16. A solid catalyst component for olefin polymerization according to claim 1, wherein the component (D) is ethylaluminum dichloride.

17. A solid catalyst component for olefin polymerization according to claim 1, wherein the component (D) is isobutylaluminum dichloride.

18. A solid catalyst component for olefin polymerization according to claim 1, wherein the oxidative component [component (E)] is a mixed gas between oxygen or ozone and nitrogen, argon or helium, benzoyl peroxide, lauryl peroxide, cumene peroxide, tert-butyl peroxide, chlorine, bromine, iodine, bromine chloride, or a mixture of at least two of these.

19. A solid catalyst component for olefin polymerization according to claim 1, wherein the intermediate product (II) is isolated from the reaction mixture.

20. A solid catalyst component for olefin polymerization according to claim 1, wherein the atomic ratio of the component (A) in terms of silicon atom to the component (B) in terms of transition metal atom is in the range of from 1:50 to 50:1.

21. A solid catalyst component for olefin polymerization according to claim 1, wherein the atomic ratio of the component (A) in terms of silicon atom to the component (B) in terms of transition metal atom is in the range of from 1:20 to 20:1.

22. A solid catalyst component for olefin polymerization according to claim 1, wherein the atomic ratio of the component (A) in terms of silicon atom to the component (B) in terms of transition metal atom is in the range of from 1:2 to 2:1.

23. A solid catalyst component for olefin polymerization according to claim 1, wherein the reaction ratio of the reaction mixture (I) to the component (C) is 1:10 to 10:1 in terms of the atomic ratio of the sum of silicon atom and transition metal atom of the reaction mixture (I) to magnesium atom of the component (C).

24. A solid catalyst component for olefin polymerization according to claim 1, wherein the intermediate product (II) and the component (D) and the component (E) are contacted in a sequence wherein the intermediate product (II) and the component (E) are contacted to obtain a reaction product (III) and the reaction product (III) is contacted with the component (D), or in a sequence wherein the intermediate product (II) and the component (D) are contacted to obtain a hydrocarbon-insoluble product (IV) and the hydrocarbon-insoluble product (IV) is contacted with the component (E).

25. A solid catalyst component for olefin polymerization according to claim 1, wherein the reaction ratio of the intermediate product (II) or the reaction product (III) to the component (D) is 0.01 to 0.1 gram equivalent in terms of halogen atom contained in the component (D) relative to 1 g of the intermediate product (II) or the reaction product (III).

26. A solid catalyst component for olefin polymerization according to claim 1, wherein the reaction ratio of the intermediate product (II) or the hydrocarbon-insoluble product (IV) to the component (E) is 0.1 to 100 moles of the component (E) relative to 1 mole of transition metal of the intermediate product (II) or the hydrocarbon-insoluble product (IV).

* * * * *